Aug. 14, 1945.  F. B. LOMAX  2,382,492
APPARATUS FOR TREATING EGGS
Filed Sept. 2, 1941
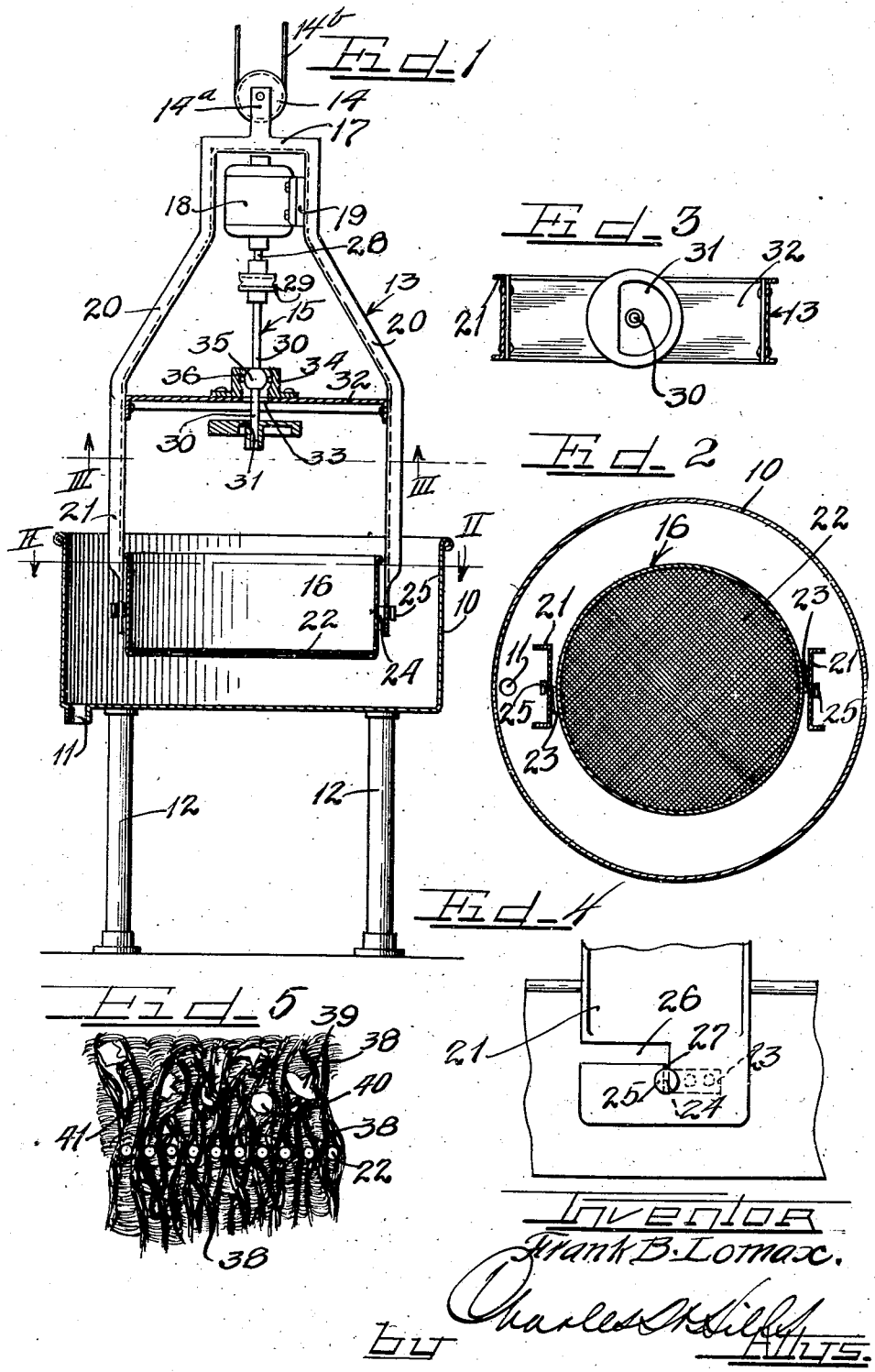

Patented Aug. 14, 1945

2,382,492

UNITED STATES PATENT OFFICE 2,382,492

APPARATUS FOR TREATING EGGS

Frank B. Lomax, Chicago, Ill.

Application September 2, 1941, Serial No. 409,263

2 Claims. (Cl. 210—149)

The invention relates generally to apparatus for and a process of treating eggs. More particularly, the invention is directed to an apparatus and process for preparing eggs for the confectionery trade or for storage in cans or the like under reduced temperatures.

Eggs prepared for the above purposes must be free from shell particles, free from barnyard filth, and must contain none of the chalaza, membranous matter, blood spots or "meat balls," other than the portions thereof which have become disintegrated sufficiently during the treating process so that they pass through a filtering screen having 14, 16, 18, or 20 wires to the linear inch (preferably 18). Furthermore, the egg material resulting from the process must be of uniform color and must be so thoroughly mixed that the resulting product is a homogeneous mass.

The present invention aims to provide a new and improved way of disintegrating liquid egg material irrespective of whether the material being treated comprises egg meats, egg whites, or both.

An important object of the invention is to provide an apparatus and process whereby the treatment of eggs as above set forth may be accomplished, if desired, without the use of artificially induced pressure or suction, whereby the egg material is not unnecessarily churned and particles of egg shell and foreign matter are not forced against and through the filter medium to such a degree as to require constant scraping of matter adhering to the barrier.

Another object of the invention is to provide a process whereby the yolks and/or whites of eggs may be separated from the extraneous matter as above set forth and mixed into a homogeneous mass after passing through a minimum amount of manipulation and mechanical handling, such as pumping and the like.

Another object of the invention is to provide an apparatus and process for the treatment of eggs whereby the mixing and filtering steps are accomplished as the material flows through the apparatus, this flow, and the resulting mixing and filtering, being facilitated by agitation.

Another object of the invention is to provide an apparatus for treating eggs which is highly sanitary and easily kept clean, in that all of the parts are completely open and no confining pipes, pumps and the like need be used for the mixing or filtering process.

Still another object of the invention is to provide improved apparatus for the treatment of eggs as above set forth which is of simple and cheap construction and which is easily and cheaply maintained and operated.

Another object of the invention is to provide an apparatus and process wherein the eggs may be filtered and mixed by a single mechanism in a single operative step.

Another object of the invention is to provide an apparatus and process for the purposes described, wherein the solid particles of foreign matter and egg shell are circulated to prevent accumulation thereof at the surface of the filtering medium but wherein chalaza may become enmeshed with the filter medium to afford a screen through which the liquid egg material must seep.

In accordance with the general features of this invention there is provided a method of and apparatus for effecting disintegration of liquid egg material through a screen by the vibration of the screen.

Many other advantages of the invention will become apparent from the following specification and the accompanying drawing, in which:

Figure 1 is a side elevation, partly in cross section, of an apparatus embodying the present invention;

Figure 2 is a cross sectional view taken on the line II—II of Figure 1;

Figure 3 is a cross sectional view taken on the line III—III of Figure 1;

Figure 4 is an enlarged fragmentary view showing the manner in which the filter device is secured to the remainder of the mechanism; and Figure 5 is an enlarged cross section of the filter medium showing the manner in which the chalaza enmeshes with the screen to augment the filtering effect thereof.

It is to be understood that the embodiment shown herein is for illustrative purposes only, and may be changed or modified without departing from the spirit and scope of the invention as set forth in the appended claims.

It is believed that my novel process may be best understood from a description of an apparatus for practicing same.

In the drawing, 10 represents a suitable receptacle for the treated eggs, this receptacle having an open top and having a suitable discharge spout 11 in or near the lower wall thereof. The receptacle 10 may be supported in any suitable manner, such as on standards 12.

To the end that the egg material may be delivered directly into the receptacle 10 as a homogeneous mix of uniform color, there is suspended, over the receptacle for operation therein, a filter and mixer mechanism, which includes a frame 13, a supporting pulley 14 rotatably mounted on lugs 14a, which may be integral with the frame 13, a motor driven agitating mechanism 15 and an open filtering and mixing vessel 16.

The frame 13, for purposes of strength and rigidity, is formed from channel-shaped stock (see Figure 3) and includes a top bridge section 17 having arms depending from the ends thereof and having the lugs 14a upstanding thereof. In the embodiment disclosed, the arms depend parallel to one another to form a relatively narrow portion in which an electric motor 18 is mounted as by a suitable bracket 19. At the lower end of the narrow portion of the frame the arms are bent away from one another to form angularly disposed intermediate sections 20 which, in turn, terminate at their lower ends in depending, parallelly disposed sections upon which the filtering receptacle 16 is mounted.

The receptacle 16 is provided with a perforated metal or wire mesh bottom 22, the mesh being of such a size that it has 14, 16, 18, or 20 wires to the linear inch. If desired, a suitable scraper mechanism may be provided in the receptacle 16 for intermittently cleaning the screen after extended periods of usage.

To the end that the broken egg material in the receptacle 16 will not accumulate on one side of the bottom as it is tipped slightly and thus spill the contents into the receptacle 10, suitable means may be provided herein for removably securing the mixing and filtering receptacle 16 in non-tipping relationship on the frame 13. In the present embodiment, this is accomplished by a pair of brackets formed from strip material having sections 23 spot welded or riveted to the walls of the receptacle 16 at diametrically opposed points. The sections 23 of the brackets have outwardly extending sections 24 at one end thereof, these latter sections terminating in heads 25. By reference to Figure 4, it will be seen that the lower ends of arm sections 21 of the frame are provided with horizontal slots which are, in width, slightly greater than the width of the strip from which the brackets are formed. Each of the slots 26 terminates at its lower end in a downwardly extending vertical slot 27 which is, in width, slightly greater than the thickness of the material from which sections 24 of the brackets are formed. Thus it will be seen that when the sections 24 of the brackets are fitted into the vertical slots 27, the mixing and filtering receptacle 16 is secured against tipping relative to the frame.

In order that the frame 13 with its associated parts may be suspended over the receptacle 10 for free vibrating movement and for vertical adjustment relative thereto, the entire mechanism is suitably and adjustably suspended upon a suspension cable 14b which is trained under the pulley 14. It will be understood that one end of the cable is anchored, that the free end may be manipulated, and that, depending upon the size of the filtering and mixing mechanism, a differential pulley arrangement may be provided.

To the end that the mixing and filtering assembly, suspended as above described, may be vibrated to agitate the contents of the receptacle 16 over the screen 22 there is shown in the present embodiment a vibrating mechanism. Other devices for performing this function may however be provided, the one shown herein having been found highly satisfactory.

The shaft 28 of the motor 18 is connected with a flexible coupling 29 which protects the motor parts from possible vibration of the shaft 28. The coupling 29 has in turn, a drive shaft 30, there being an eccentrically weighted fly wheel 31 fixedly secured at the lower end thereof. To the end that the frame 13 may be reinforced, and the shaft 30 maintained in true alignment against distortion by the fly wheel 31 when it is rotated by the motor, there is provided herein a channel cross piece 32 which is secured between the upper ends of sections 21 of the frame 13. The cross piece 32 is apertured at 33 to receive the drive shaft 30 therethrough and has a spherical ball bearing race 34 mounted thereon in alignment with the aperture 33, the drive shaft 30 being enlarged at 35 to provide a bearing portion for engaging the bearings 36.

In operation, the liquid egg material, together with residuum of shell, chalaza, blood spots, meat balls, dirt, and the like, are placed in the receptacle 16 after the whole eggs have been candled and then broken to remove a major portion of the shell therefrom. Thereafter, the treatment of the eggs occurs in the receptacle 16 without further mechanical manipulation or passage thereof through conduits or other mechanisms, except for the drainage by gravity into the receptacle 10 and into the ultimate container such as a 30-pound can through the outlet 11.

The eggs having been placed in the receptacle 16, the motor is turned on and, due to the eccentricity of the flywheel 31, the entire frame and its associated parts are vibrated. This vibration facilitates the passage of the egg material through the screen 22 by maintaining the body of egg meats in constant agitation and by keeping the collected solids such as dirt particles and egg shell in constant movement over the inner surface of the screen 22. It also causes mixing of the contents of the receptacle 16 so that after passage through the screen, the egg yolks and/or whites have been toned to form a substantially homogeneous mass of uniform color, free from shell particles, dirt, perceptible particles of chalaza and perceptible particles of membranous matter.

The degree of vibration and agitation depends upon the speed of the motor. It has been found that a motor having a speed of 1,250 to 2,000 R. P. M. provides a desirable degree of vibrating movement for the frame and its associated parts.

From the foregoing it will be seen that there has been provided a simple, inexpensive mechanism and an improved process whereby the liquid egg material is filtered and mixed into a homogeneous mass with a minimum of handling, and in which the egg material gravitates freely from one receptacle to the other and thence to the ultimate container. It will also be seen that the sanitary features and the maintenance of the apparatus are enhanced by the utilization of open receptacles which are readily cleaned.

Furthermore, it will be seen that there is provided herein an apparatus and process whereby, due to the elimination of pressure and suction, the solid particles of egg shell and the like do not accumulate against the filter medium to clog the same prematurely, but rather these particles are circulated throughout the mass of egg material remaining in the filter vessel 16 by agitation to keep the screen relatively free for the passage of the yolks and/or whites.

From Figure 5 it will be seen that the filter mechanism, designated as 22, enmeshes the chalaza 38 in such a manner that the latter passes through the interstices to augment the filter effect thereof. It will also be seen that the particles of egg shell 39, meat balls 40, dirt 41, due to the constant agitation of the unfiltered material, do not accumulate at the filter barrier but remain suspended in the unfiltered egg material whereby undue clogging of the barrier is avoided.

I claim as my invention:

1. In an apparatus for treating liquid egg material or the like, a filter vessel having a foraminous filter wall, the foraminae of which are in the order of those of a wire mesh having 14 to 20 wires to the linear inch, means for freely suspending said vessel and means for vibrating said vessel, said last named means including an unbalanced fly wheel associated with said vessel and means for rotating said fly wheel at a speed substantially between 1,250 and 2,000 R. P. M.

2. In an apparatus for treating liquid egg material, a foraminous vessel for untreated egg material, means for mounting said vessel for agitation to progress the liquid egg material through the foramina thereof, means for connecting the foraminous vessel to the agitating means in readily removable, non-tipping relationship including slots in the agitating means and flat supporting members extending from the foraminous vessel, said members being arranged to fit snugly into said slots, and said agitating means including enlarged cut-away portions connected with the slots to afford removal of the supporting means therefrom.

FRANK B. LOMAX.